(12) United States Patent
Panin (10) Patent No.: US 9,916,831 B2
(45) Date of Patent: Mar. 13, 2018

(54) SYSTEM AND METHOD FOR HANDLING A SPOKEN USER REQUEST

(71) Applicant: YANDEX EUROPE AG, Lucerne (CH)

(72) Inventor: Alexander Gennadievich Panin, Isheevka (RU)

(73) Assignee: YANDEX EUROPE AG, Lucerne (CH)

( * ) Notice: Subject to any disclaimer, the term of this patent is extended or adjusted under 35 U.S.C. 154(b) by 0 days.

(21) Appl. No.: 15/109,729

(22) PCT Filed: Dec. 1, 2014

(86) PCT No.: PCT/IB2014/066478
§ 371 (c)(1),
(2) Date: Jul. 5, 2016

(87) PCT Pub. No.: WO2015/181588
PCT Pub. Date: Dec. 3, 2015

(65) Prior Publication Data
US 2016/0379636 A1    Dec. 29, 2016

(30) Foreign Application Priority Data

May 30, 2014   (RU) .................................. 2014122484

(51) Int. Cl.
*G10L 15/22*    (2006.01)
*H04M 11/10*   (2006.01)
(Continued)

(52) U.S. Cl.
CPC .............. *G10L 15/22* (2013.01); *G10L 15/26* (2013.01); *G10L 15/32* (2013.01); *H04M 11/10* (2013.01); *G10L 2015/223* (2013.01)

(58) Field of Classification Search
CPC ....................................................... G10L 15/22
(Continued)

(56) References Cited

U.S. PATENT DOCUMENTS 6,233,559 B1    5/2001  Balakrishnan
7,721,301 B2 *  5/2010  Wong ...................... G10L 15/26
                                                                 455/563
(Continued)

FOREIGN PATENT DOCUMENTS

RU       2494476 C2     9/2013
WO    2010141802 A1    12/2010

OTHER PUBLICATIONS

International Search Report from PCT/IB2014066478, dated Apr. 6, 2015, Blaine R. Copenheaver.
(Continued)

*Primary Examiner* — Susan McFadden
(74) *Attorney, Agent, or Firm* — BCF LLP (57) ABSTRACT

A method and an electronic device for handling a spoken user request of a user, executable by each one of at least two applications installed on the electronic device, comprising determining that the spoken user request corresponds to an action executable by an other one of the at least two of the applications; and causing execution of the action by the other one of the at least two of the applications. A method and an electronic device for handling a spoken user request received from a user of the electronic device, comprising detecting reception of a spoken user request by a first application; transferring the spoken user request to the second application by the first application; determining, by the second application, that the spoken user request corresponds to an action executable by a third application; and causing, by the second application, execution of the action by the third application.

6 Claims, 7 Drawing Sheets

(51) Int. Cl.
    *G10L 15/26*     (2006.01)
    *G10L 15/32*     (2013.01)

(58) Field of Classification Search
    USPC .......................................................... 704/235
    See application file for complete search history.

(56) References Cited

U.S. PATENT DOCUMENTS

| | | | |
|---|---|---|---|
| 8,260,617 B2 * | 9/2012 | Dhanakshirur | G10L 15/22 |
| | | | 379/88.01 |
| 8,515,766 B1 | 8/2013 | Bringert et al. | |
| 8,588,378 B2 * | 11/2013 | Davies | G10L 15/22 |
| | | | 379/88.04 |
| 8,620,667 B2 | 12/2013 | Andrew | |
| 8,876,611 B2 * | 11/2014 | Yuan | G07F 17/3225 |
| | | | 463/31 |
| 9,449,602 B2 * | 9/2016 | Ooi | G10L 19/008 |
| 9,495,975 B2 * | 11/2016 | Short | G10L 21/0272 |
| 9,542,956 B1 * | 1/2017 | Nostrant | G10L 21/00 |
| 2005/0288936 A1 | 12/2005 | Busayapongchai et al. | |
| 2009/0030696 A1 | 1/2009 | Cerra et al. | |
| 2011/0054899 A1 | 3/2011 | Phillips et al. | |
| 2011/0268260 A1 | 11/2011 | Madhavapeddi et al. | |
| 2013/0013319 A1 | 1/2013 | Grant et al. | |
| 2013/0191122 A1 | 7/2013 | Mason | |
| 2013/0283199 A1 | 10/2013 | Selig et al. | |
| 2014/0006025 A1 | 1/2014 | Krishnan et al. | |

OTHER PUBLICATIONS

Russian search report from Russian Patent Application No. 2014122484, dated Aug. 9, 2017.
Extended European Search Report from EP14893280.9 dated Sep. 8, 2017.

* cited by examiner

SYSTEM AND METHOD FOR HANDLING A SPOKEN USER REQUEST

CROSS-REFERENCE

The present application claims convention priority to Russian Patent Application No. 2014122484, filed May 30, 2014, entitled "SYSTEM AND METHOD FOR HANDLING A SPOKEN USER REQUEST" which is incorporated by reference herein in its entirety.

FIELD

The present technology relates to systems and methods for handling spoken user requests.

BACKGROUND

Speech recognition software has become increasingly common in recent years, especially since smartphones equipped with microphones and powerful processors have become widely available.

Many smartphones and other computing devices available today include software which allows users to enter text by uttering a word or phrase into the smartphone's microphone. For example, speech-to-text software such as DragonDictate™ may be used to interpret a recorded audio representation of a spoken utterance and generate an estimated text representation of the spoken utterance.

Some computing devices also allow users to issue commands via spoken requests, thereby enabling at least partial hands-free operation of those devices, which conventionally have required user input to be provided via mouse clicks, keystrokes, and/or taps of a touch screen. Well-known examples include the Apple™ speech-recognition application, Siri™, installed on many iPhone™ smartphones and other iOS™ devices, the Google Now™ speech-recognition application which runs, among others, on smartphones running the Google Android™ operating system, and the Microsoft Cortana™ speech-recognition application which runs on many Windows Phone™ devices. These speech recognition software applications are also sometimes known as intelligent personal assistants, because they provide a one-stop service akin to that of a personal assistant, fielding potentially vague requests from a user and either responding directly to simple requests, or handing the requests off to more specialized applications such as web browsers and mapping applications if the request is deemed to require more specialized attention.

SUMMARY

Inventors have developed embodiments of the present technology based on their appreciation of at least one shortcoming of the prior art. Notably, although existing methods for handling spoken user requests via a centralized intelligent personal assistant may be advantageous in some circumstances, in other circumstances, a decentralized approach may be more appropriate, such that various applications themselves capable of responding to spoken user requests may directly or indirectly refer spoken user requests to one another.

The present technology thus arises from the inventors' recognition that in some cases, it may be desirable for an application to be able to transfer a spoken user request which it has received to another application better suited to handle that spoken user request. Moreover, it may be desirable to transfer such spoken user requests without necessarily relying on a intelligent personal assistant of the operating system. One advantage of such unmediated transfers of spoken user requests among applications is that the developers of those applications may retain control over the types of spoken user requests that are transferred, the conditions under which they are transferred, and the applications to which they are transferred. For example, a developer of a web browser application may refer spoken user requests received by that web browser application which pertain to navigation (e.g. "Show me the way to the nearest coffee shop") to a mapping application designed by that same developer, thus retaining the attention of the user within the universe of applications developed by that same developer instead of relinquishing control over which application handles the spoken user request to a platform-wide intelligent personal assistant which may have been developed by a different developer with different commercial interests.

Thus, in a first aspect, various implementations of the present technology provide a computer-implemented method for handling a spoken user request received from a user of an electronic device comprising a processor configured to execute applications, the method executable by each one of at least two of the applications, the method comprising:
  determining that the spoken user request corresponds to an action executable by an other one of the at least two of the applications; and
  causing execution of the action by the other one of the at least two of the applications.

In a second aspect, various implementations of the present technology provide an electronic device for handling a spoken user request received from a user, the electronic device comprising: a processor; and a memory operatively coupled to the processor and storing applications, each one of at least two of the applications comprising program instructions executable by the processor to cause the processor to:
  determine that the spoken user request corresponds to an action executable by an other one of the at least two applications; and
  cause execution of the action by the other one of the at least two applications.

In some implementations of either one of the first aspect and the second aspect, determining that the spoken user request corresponds to the action comprises determining that a text representation of the spoken user request corresponds to the action. In some further implementations, causing execution of the action by the other one of the at least two of the applications comprises transferring at least part of the text representation of the spoken user request to the other one of the at least two of the applications.

In some further implementations of the first aspect, the method further comprises, before determining that the text representation of the spoken user request corresponds to the action, causing processing of an audio representation of the spoken user request to obtain the text representation of the spoken user request. Likewise, in some further implementations of the second aspect, each one of the at least two applications further comprises program instructions executable by the processor to effect, before determining that the text representation of the spoken user request corresponds to the action, causing processing of an audio representation of the spoken user request to obtain the text representation of the spoken user request. In some yet further implementations, causing processing of the audio representation of the spoken user request to obtain the text representation of the spoken user request comprises causing execution of speech-to-text program instructions included in a software library installed on the electronic device.

In some further implementations of the first aspect, the method further comprises, before determining that the text representation of the spoken user request corresponds to the action, receiving the text representation of the spoken user request from a speech-to-text application being one of the applications, the speech-to-text application having processed an audio representation of the spoken user request to obtain the text representation of the spoken user request. Likewise, in some further implementations of the second aspect, at least one of the applications includes program instructions executable by the processor to effect, before determining that the text representation of the spoken user request corresponds to the action, processing of an audio representation of the spoken user request to obtain the text representation of the spoken user request.

In some further implementations of the first aspect, the method further comprises, before determining that the text representation of the spoken user request corresponds to the action, receiving the text representation of the spoken user request from speech-to-text program instructions included as part of an operating system of the electronic device, the speech-to-text program instructions having processed an audio representation of the spoken user request to obtain the text representation of the spoken user request. Likewise, in some further implementations of the second aspect, the memory further stores an operating system of the electronic device, the operating system including program instructions executable by the processor to effect, before determining that the text representation of the spoken user request corresponds to the action, processing of an audio representation of the spoken user request to obtain the text representation of the spoken user request.

In a third aspect, various implementations of the present technology provide a computer-implemented method for handling a spoken user request received from a user of an electronic device comprising a processor configured to execute applications, the method comprising:
  detecting reception of a spoken user request by a first application;
  transferring the spoken user request to the second application by the first application;
  determining, by the second application, that the spoken user request corresponds to an action executable by a third application; and
  causing, by the second application, execution of the action by the third application.

In a fourth aspect, various implementations of the present technology provide an electronic device for handling a spoken user request of a user, the electronic device comprising: a processor; and a memory operatively coupled to the processor and storing applications including a first application, a second application, and a third application, the first application being executable by the processor to detect reception of the spoken user request and transfer the spoken user request to the second application, and the second application being executable by the processor to determine that the spoken user request corresponds to an action executable by the third application and cause execution of the action by the third application.

In some implementations of either one of the third aspect and the fourth aspect, the first application and the third application are a same application. In other words, the second application causes the same application which transferred it the spoken user request to perform an action corresponding to that spoken user request. In other implementations, the third application is an application other than the first application.

In some implementations of either one of the third aspect and the fourth aspect, determining that the spoken user request corresponds to the action comprises determining that a text representation of the spoken user request corresponds to the action. In some further implementations, causing execution of the action by the third application comprises transferring at least part of the text representation of the spoken user request to the third application.

In some further implementations of the third aspect, detecting reception of the spoken user request comprises appreciating an audio representation of the spoken user request, transferring the spoken user request comprises transferring the audio representation of the spoken user request, and the method further comprises, before determining that the text representation of the spoken user request corresponds to the action, processing the audio representation of the spoken user request by the second application to obtain the text representation of the spoken user request. Likewise, in some further implementations of the fourth aspect, detecting reception of the spoken user request comprises appreciating an audio representation of the spoken user request, transferring the spoken user request comprises transferring the audio representation of the spoken user request, and the second application is further executable to process the audio representation of the spoken user request to obtain the text representation of the spoken audio request before determining that the text representation of the spoken user request corresponds to the action.

In other aspects, various implementations of the present technology provide a non-transitory computer readable medium storing program instructions executable by a processor of an electronic device to carry out at least one of the above-described methods.

In the context of the present specification, unless expressly provided otherwise, an "electronic device" is any hardware and/or software appropriate to the relevant task at hand. Thus, some (non-limiting) examples of electronic devices include computers (servers, desktops, laptops, netbooks, etc.), smartphones, and tablets, as well as network equipment such as routers, switches, and gateways.

In the context of the present specification, unless expressly provided otherwise, a "display" of an electronic device is any electronic component capable of displaying an image to a user of the electronic device. Non-limiting examples include cathode ray tubes, liquid crystal displays, plasma televisions, projectors, and head-mounted displays such as Google Glass™.

In the context of the present specification, unless expressly provided otherwise, a "server" is one or more digital electronic devices, possibly but not necessarily including one or more processors running appropriate software, capable of receiving requests (e.g. from client devices) over a network, and carrying out those requests or causing those requests to be carried out. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included herein wherever the expression "server" is used.

In the context of the present specification, unless expressly provided otherwise, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, unless expressly provided otherwise, the expression "indication of" is meant to refer to any type and quantity of information enabling identification of the object which it qualifies, whether or not that information includes the object itself. For instance, an "indication of text" refers to information enabling identification of the text in question, whether or not that information includes the text itself. Non-limiting examples of indications that do not include the object itself include hyperlinks, references, and pointers.

In the context of the present specification, unless expressly provided otherwise, a "screenshot image" of a display is meant to refer to an image substantially replicating the visual content displayed on the display at a given time (usually but not necessarily at the time generation of the screenshot image was requested).

In the context of the present specification, unless expressly provided otherwise, the expression "component" is meant to refer either to hardware, software, or a combination of hardware and software that is both necessary and sufficient to achieve the specific function(s) being referenced. For example, a "voice recognition component" includes hardware and/or software suitable for translating a live or previously recorded audio sample of a human voice into a textual equivalent.

In the context of the present specification, unless expressly provided otherwise, the expression "computer-readable medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first application" and "third application" is not intended to imply any particular order, type, chronology, hierarchy or ranking (for example) of/between the applications, nor is their use (by itself) intended imply that any "second application" must necessarily exist in any given situation. Further, as is discussed herein in other contexts, reference to a "first" element and a "second" element does not preclude the two elements from being the same actual real-world element. Thus, for example, in some instances, a "first" component and a "second" component may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
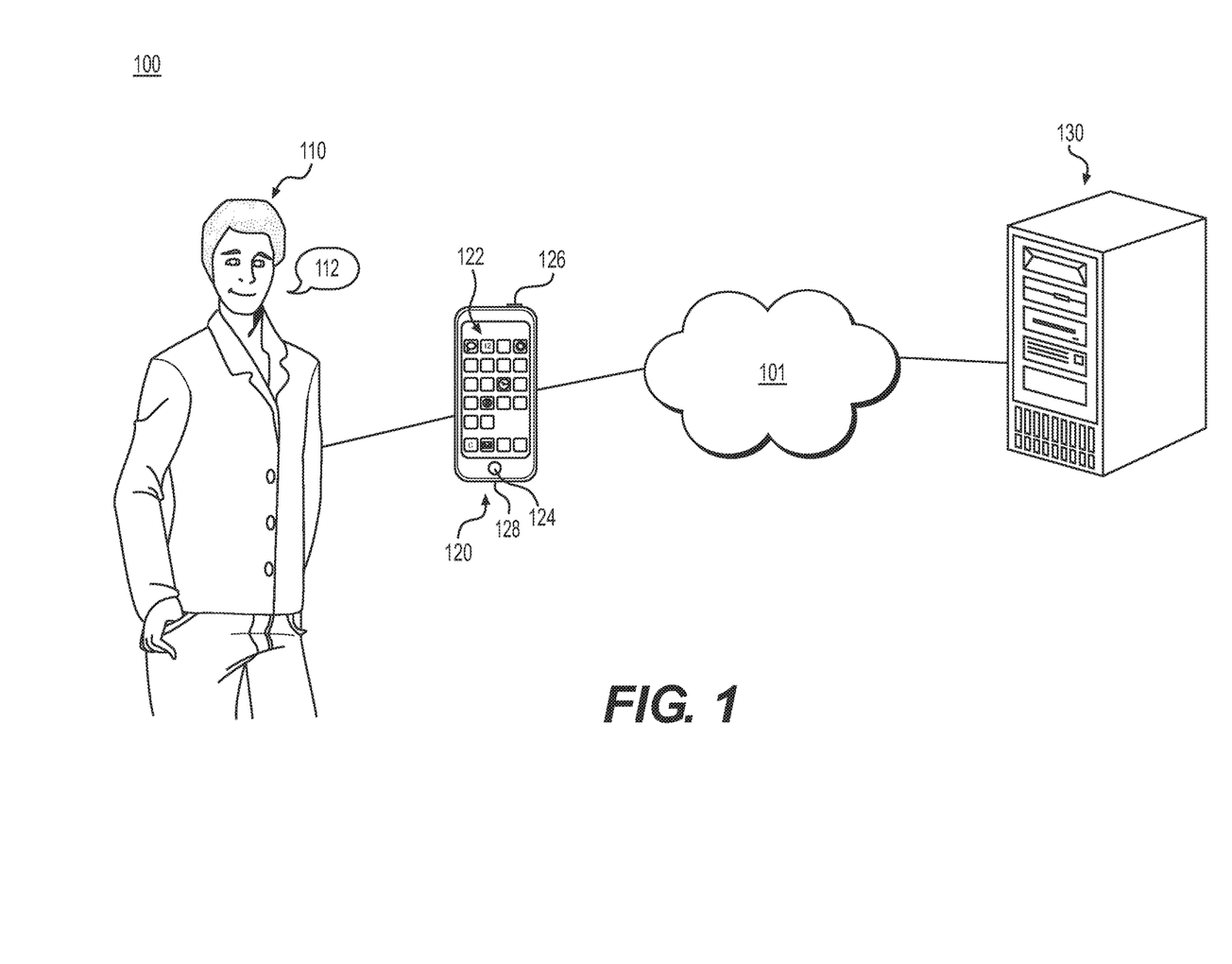
FIG. 1 is a context diagram of a networked computing environment suitable for use with implementations of the present technology described herein.

Referring to FIG. 1, there is shown a diagram of a networked computing environment 100 comprising a smartphone 120 in communication with a search engine 130 via a communications network 101 (e.g. the Internet or the like). It is to be expressly understood that the various elements of networked computing environment 100 depicted herein and hereinafter described are merely intended to illustrate some possible implementations of the present technology. The description which follows is not intended to define the scope of the present technology, nor to set forth its bounds. In some cases, what are believed to be helpful examples of modifications to networked computing environment 100 may also be described below. This is done merely as an aid to understanding, and, again, not to define the scope or bounds of the present technology. These modifications are not an exhaustive list, and, as a person skilled in the art would understand, other modifications are likely possible. Further, where examples of modifications are absent, the mere absence of such examples should not be interpreted to mean that no modifications are possible and/or that what is described is the sole manner of implementing that element of the present technology. As a person skilled in the art would understand, this is likely not the case. It is also to be understood that elements of the networked computing environment 100 may represent relatively simple implementations of the present technology, and that where such is the case, they have been presented in this manner as an aid to understanding. As persons skilled in the art would understand, various implementations of the present technology may be of a greater complexity. Software modules, or simply modules which are implied to be software, may be represented herein as any combination of flowchart elements or other elements indicating performance of process steps and/or textual description. Such modules may be executed by hardware that is expressly or implicitly shown.

Smartphone 120 depicted in FIG. 1 is an Apple™ iPhone™ running the iOS™ operating system. In other implementations, another suitable operating system (e.g.

Google Android™, Microsoft Windows Phone™, BlackBerry OS™) may be used. Moreover, because the present technology is not limited to mobile devices, smartphone 120 may be replaced by a non-mobile device in other implementations of the present technology. In the depicted implementation, smartphone 120 includes a touchscreen display 122, a home button 124, a power button 126, and a microphone 128. Smartphone 120 is being operated by user 110, who is uttering a spoken user request 112.

Figure 2:
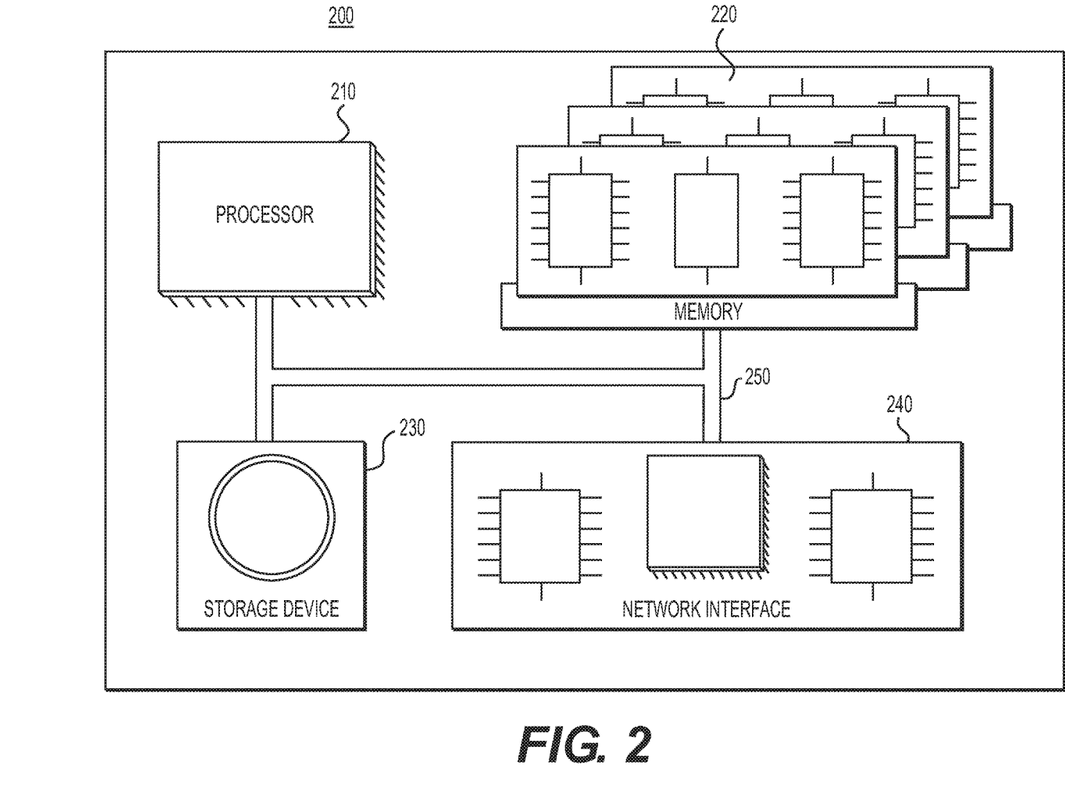
FIG. 2 is a block diagram of a computer system including various hardware components, suitable for implementing the present technology.

With reference to FIG. 2, there is shown a block diagram of a computer system 200 (e.g. smartphone 120) suitable for implementing the present technology. The computer system 200 is comprised of hardware components including a processor 210, a memory 220, a storage device 230, and a network interface 240. Each of the memory 220, storage device 230, and network interface 240 is in communication with the processor 210 via one or more buses 250 (e.g. PCI bus, USB, SATA).

Figure 3:
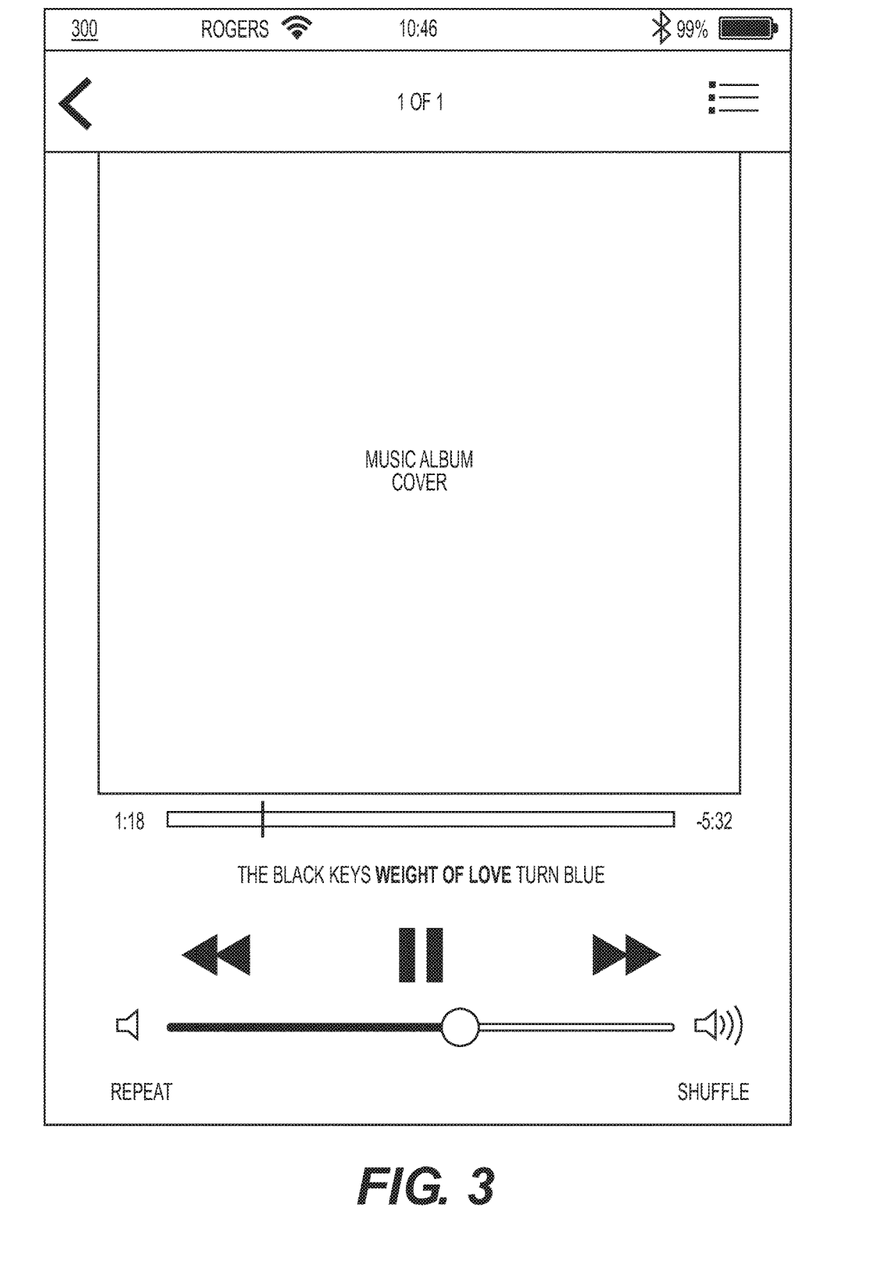
FIG. 3 is a screenshot image of a music player application as it may be displayed by an electronic device implementing the present technology.
Figure 4:
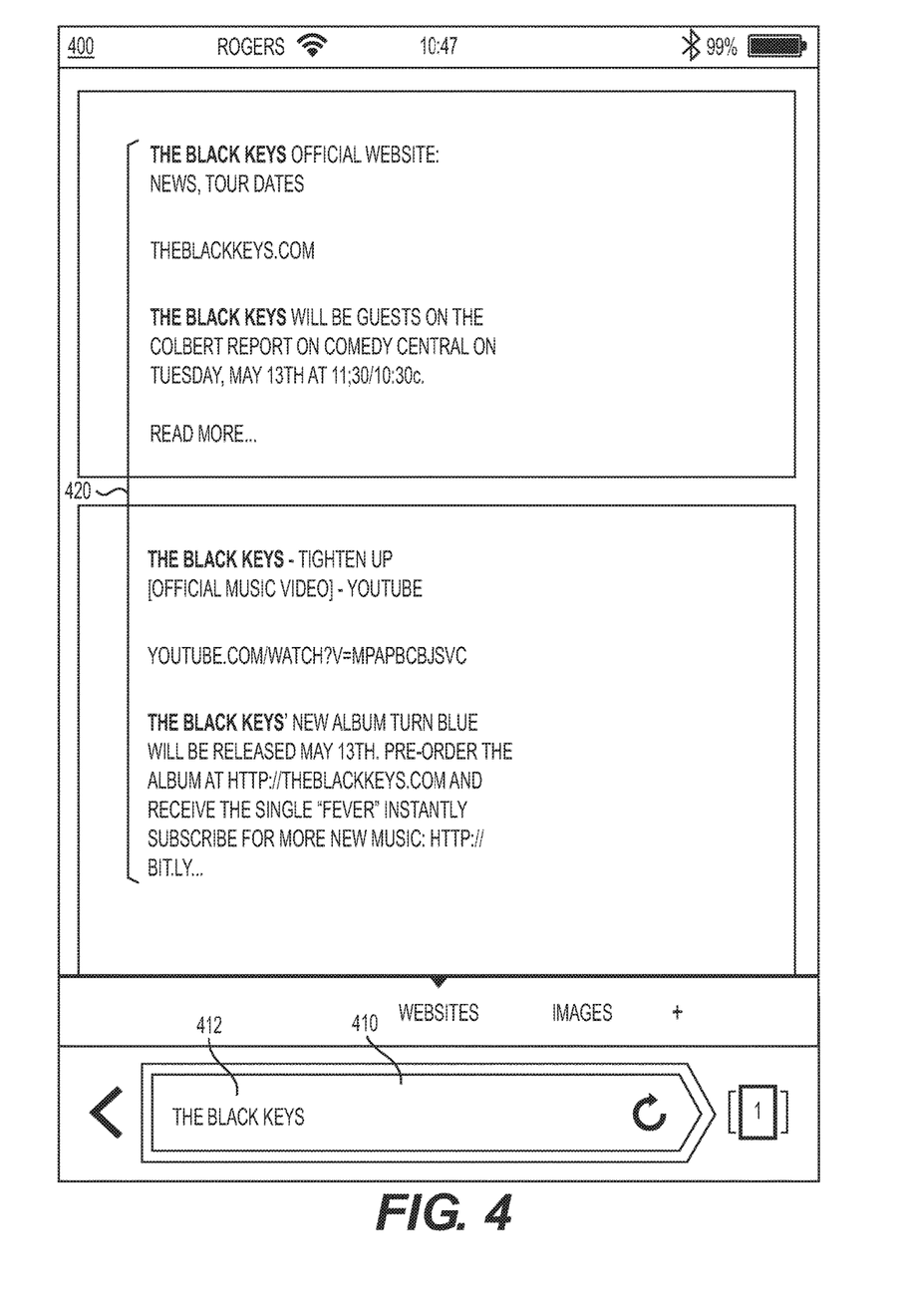
FIGS. 4 and 5 are screenshot images of a web browser application as it may be displayed by an electronic device implementing the present technology.
Figure 5:
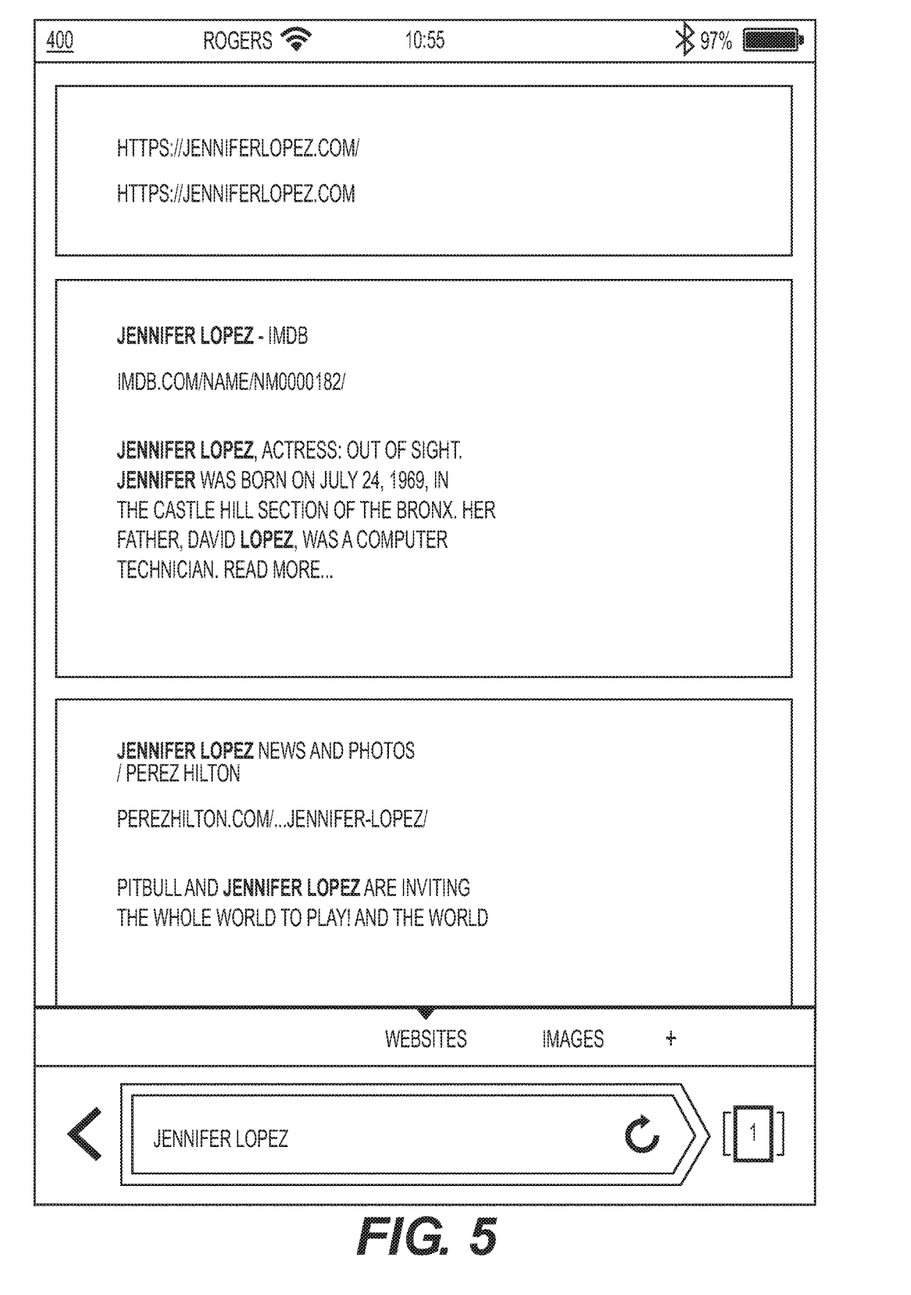

With reference to FIG. 3, FIG. 4, and FIG. 5, the following series of user interactions of user 110 with smartphone 120 illustrates various aspects of the present technology. User 110 may begin by launching an application which displays visual content on touchscreen display 122. For example, user 110 may launch a music player application 300 in a conventional way (i.e. by tapping an icon from the home screen of the operating system running on smartphone 120) and operate the music player application 300 to play the song "Weight of Love" by The Black Keys as depicted in FIG. 3.

After enjoying the song for a while, user 110 may want to look for more information about the artist. If the music player application 300 includes spoken user request handling functionality implementing the present technology, the user 110 may thus utter a spoken user request 112 consisting of a phrase such as "Search for The Black Keys". It should be noted that in some implementations of the present technology, the user 110 may first need to issue a command to the music player application 300 using conventional means (e.g. by tapping on a user interface element such as a button depicting a microphone on the touch screen display 122— the button depicting the microphone not being depicted in the illustration of FIG. 3) to place the music player application 300 in an audio recording mode suitable for detecting and receiving the spoken user request 112 via the microphone 128 of smartphone 120.

In other implementations, the music player application 300 may be designed to always be listening for spoken user requests, such that the user 110 may simply issue the spoken user request 112 without first providing an indication to the music player application 300 to expect the spoken user request 112. In yet other implementations, the operating system of the smartphone 120 may be in a permanent listening mode and may initially handle the spoken user request 112 instead of the music player application 300.

Once uttered by user 110, the spoken user request 112 may be recorded via the microphone 128 to produce an audio representation of the spoken user request 112 (e.g. an audio file containing an utterance (i.e. audio representation) representative of the spoken user request 112). The program instructions responsible for recording the audio representation of the spoken user request 112 may, as non-limiting examples, be part of the music player application 300, part of a software library (not depicted) installed on smartphone 120 which the music player application 300 may cause to be executed, or part of the operating system of smartphone 120.

Next, the audio representation of the spoken user request 112 may be processed to obtain a text representation of the spoken user request 112 (e.g. to obtain the string "search for the black keys"). Again, as was the case above in respect of the audio recording instructions, the speech-to-text instructions may, as non-limiting examples, be part of the music player application 300, part of a software library (not depicted) installed on the smartphone 120, or part of the operating system of smartphone 120.

Having obtained the text representation of the spoken user request 112 "search for the black keys", the music player application 300 may then execute program instructions to determine that the spoken user request 112 corresponds to an action (performing a search) executable by another application installed on the smartphone 120, namely a web browser 400 depicted in FIG. 4 and FIG. 5. It should expressly understood that the present technology is not limited to any particular technique for determining that the spoken user request 112 corresponds to the action executable by the web browser application 400, and any known technique may be employed. For example, the music player application 300 may parse the text representation of the spoken user request 112 and interpret the phrase "search for" as indicative of a search to be performed using the subsequent phrase "the black keys" as search query, and the music player application 300 may be configured, either at compile time or at run time, to transfer all search queries to the web browser application 400. As a result, the music player application 300 may next cause the search to be performed by the web browser application 400. This may involve transferring by the music player application 300 to the web browser application 400 of at least part of the text representation of the spoken user request 112 to the web browser application 400 (e.g. in this instance, the search query "the black keys").

With reference to FIG. 4, the web browser application 400 is shown as it may appear after having been caused to perform the search for "the black keys" at the behest of the music player application 300. For example, the search may have been performed by web browser 400 by communicating with the search engine 130 via the communications network 101 of FIG. 1. The search terms "the black keys" of the search query 412 appear in the search bar 410, with search results 420 displayed thereabove. The process by which the search engine 130 performs the search and displays the results is generally implemented in accordance with known prior techniques and, as such, will not be described here at any further length.

After considering the search results 420, user 110 may be reminded of another artist of which he is fan, Jennifer Lopez, and decide to perform a search in respect of her. If the web browser application 400 includes spoken user request handling functionality implementing the present technology, the user 110 may choose to perform the new search by uttering a new spoken user request 112 consisting of a phrase such as "Search for Jennifer Lopez" or perhaps simply "Jennifer Lopez". As was the case for music player application 300, some implementations of the web browser application 400 may need to first receive an indication from user 110 to engage an audio recording mode suitable for receiving the new spoken user request 112, while other implementations may operate in a permanent listening state suitable to receive spoken user requests 112 at any time.

The recorded audio representation of the new spoken user request 112 may then be processed by the web browser application 400, in a similar manner as the original spoken user request 112 was processed by the music player application 300, to obtain a text representation of the new spoken user request 112 (i.e. "search for jennifer lopez" or "jennifer lopez"). However, it should be noted that the specific method for voice-to-text recognition used by the web browser application 400 does not have to (but can) be the same as the method for voice-to-text recognition used by the music player application 200. The web browser application 400 may then interpret the new spoken user request 112 as a new search to be performed with the search query "jennifer lopez". FIG. 5 shows the web browser application 400 as it may appear after having performed a second search, this time for "jennifer lopez".

Meanwhile, the music player application 300 may be running in the background, continuing to play the song "The Weight of Love" by The Black Keys. User 110, now more interested in concentrating on Jennifer Lopez, may decide to pause playback of the song currently being played by the music player application 300. User 110 may initiate yet another spoken user request 112, this time uttering the phrase "Pause music". Web browser application 400, being in the foreground, may subsequently obtain a text representation of the latest spoken user request 112, "pause music".

It may then determine that the spoken user request 112 does not represent a new search query, but rather that it corresponds to an action executable by music player application 300, namely to pause music playback. As a result, web browser application 400 may cause the music player application 300 to pause playback of the song.

Figure 6:
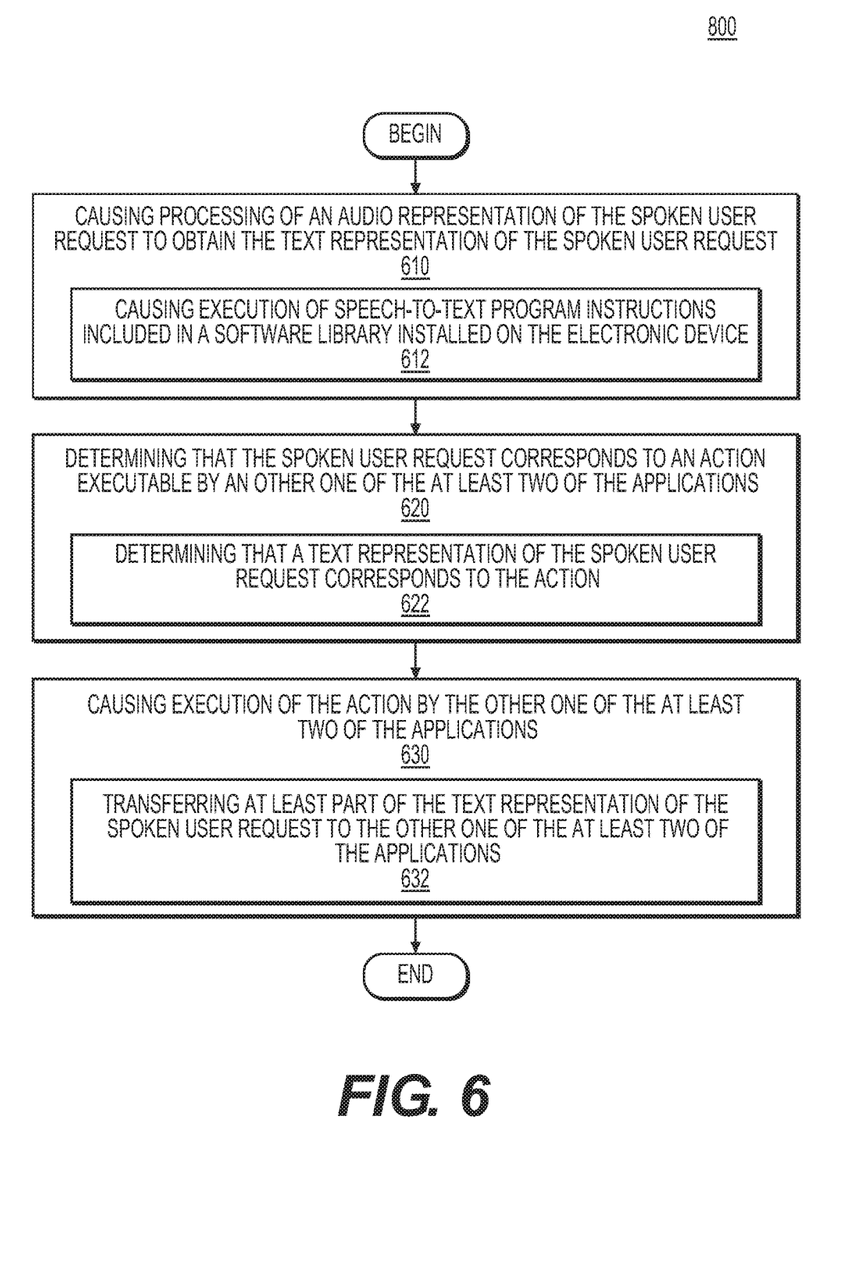
FIGS. 6 and 7 are flowcharts of methods for handling spoken user requests according to various implementations of the present technology.

FIG. 6 shows a flowchart depicting a computer-implemented method 600 for handling a spoken user request 112 received from a user 110 of an electronic device (e.g. smartphone 120) comprising a processor 210 configured to execute applications, the method executable by each one of at least two of the applications. It should be noted that the computer-implemented method 600, as depicted in FIG. 6, is executed in accordance with a non-limiting embodiment of the present technology.

At step 610, processing of the audio representation of the spoken user request 112 is caused. In some implementations, such processing may comprise step 612, wherein execution of speech-to-text instructions included in a software library installed on the electronic device (e.g. smartphone 120) is caused to obtain a text representation of the spoken user request 112 (e.g. the character string "search for the black keys" in the examples provided herein above).

At step 620, it is determined that the spoken user request 112 corresponds to an action executable by another one of the at least two applications. In some implementations, step 620 may comprise step 622, wherein it is determined that a text representation of the spoken user request 112 corresponds to the action. At step 630, execution of the action by the other one of the at least two applications is caused. In some implementations, step 630 may comprise step 632, wherein at least part of the text representation of the spoken user request 112 is transferred to the other one of the at least two applications.

In various alternative implementations of the present technology, a dedicated speech recognition application may perform some or all of the following tasks on behalf of the at least two applications: recording the audio representation of the spoken user request 112, processing the audio representation of the spoken user request 112 to obtain the text representation of the spoken user request 112, determining that the spoken user request 112 corresponds to an action executable by one of the applications, and causing the one of the applications to execute the action.

Figure 7:
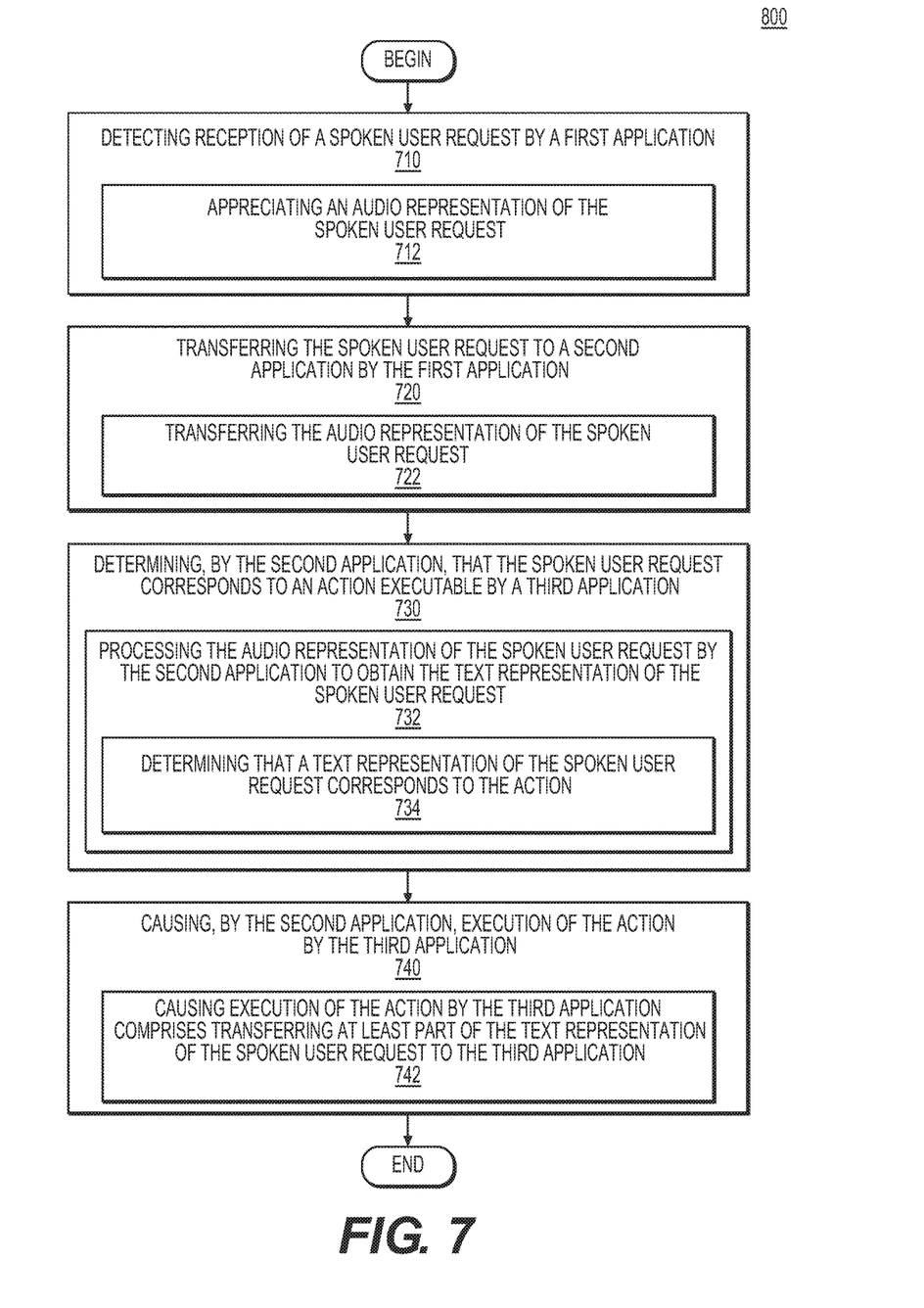

FIG. 7 shows a flowchart depicting some such alternatives, namely a computer-implemented method 700 for handling a spoken user request received from a user of an electronic device comprising a processor configured to execute applications. The method 700, as depicted in FIG. 7, is implemented in accordance with another non-limiting embodiment of the present technology.

The method 700 comprises several steps. At step 710, reception of a spoken user request 112 is detected by a first application (e.g. the music player application 300 described herein above). Next, at step 712, an audio representation of the spoken user request 112 is appreciated by the first application. At step 720 the spoken user request 112 is transferred to a second application (e.g. a dedicated speech recognition application running in the background on smartphone 120). Step 720 may comprise step 722, wherein an audio representation of the spoken user request 112 is transferred to the second application.

At step 730, the second application (e.g. the dedicated speech recognition application) determines that the spoken user request 112 corresponds to an action executable by a third application. In some cases, the third application may in fact be the same application as the first application. For example, a spoken user request 112 consisting of the phrase "Pause music" may be received by the music player application 300 and transferred to the dedicated speech recognition application, only to have the dedicated speech recognition application determine that the spoken user request 112 corresponds to an action executable by the music player application 300, the very application from which the spoken user request 112 was transferred. In other cases, the third application may be other that the first application (e.g. the first application may be the music player application 300 and the third application may be the web browser application 400).

In some implementations, step 730 comprises step 732, wherein that audio representation of the spoken user request 112 is processed by the second application to obtain the text representation of the spoken user request 112. Step 730 may further comprise step 734, wherein the second application may determine that the text representation of the spoken user request 112 corresponds to the action. At step 740, the second application causes execution of the action by the third application. Step 740 may comprise transferring by the second application to the third application of at least part of the text representation of the spoken user request 112.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implemented method for handling a spoken user request received from a user of an electronic device comprising a processor configured to execute applications, the method executable by each one of at least two of the applications, each one of the at least two applications executing a speech-to-text instructions module on the electronic device, each one of the two applications aware of actions executable by others of the at least two of the applications, the method comprising:
   processing, by a first speech-to-text module of one of the at least two of the applications of the electronic device, an audio representation of the spoken user request to obtain a first text representation of the spoken user request;
   determining by the first speech-to-text module of one of the at least two of the applications of the electronic device, based on its awareness of actions executable by others of the at least two of the applications that the first text representation of the spoken user request corresponds to an action better suited to be executable by an other one of the at least two of the applications;

transferring at least part of the first text representation of the spoken user request to the other one of the at least two of the applications by the one of the at least two of the applications, the at least part of the first text representation of the spoken user request comprising an audio representation of the spoken user request;

processing, by a second speech-to-text module of the other one of the at least two of the applications the at least part of the first text representation of the spoken user request comprising the audio representation of the spoken user request to obtain a second text representation of the spoken user request;

determining, by the second speech-to-text module of the other one of the at least two of the application, that the second text representation of the spoken user request corresponds to the action; and causing execution of the action by the other one of the at least two of the applications.

2. The method of claim 1, wherein said causing processing of the audio representation of the spoken user request to obtain the first text representation and the second text representation of the spoken user request comprises causing execution of speech-to-text program instructions included in a software library installed on the electronic device.

3. An electronic device for handling a spoken user request received from a user, the electronic device comprising:
   a processor; and
   a memory operatively coupled to the processor and storing applications, each one of at least two of the applications comprising a speech-to-text instructions module on the electronic device, each one of the two applications aware of actions executable by others of the at least two of the applications and each one of the two applications comprising program instructions executable by the processor to cause the processor to:
   process, using a first speech-to-text module of one of the at least two of the applications of the electronic device, an audio representation of the spoken user request to obtain a first text representation of the spoken user request;
   determine, using the first speech-to-text module of one of the at least two of the applications of the electronic device, based on its awareness of actions executable by others of the at least two of the applications, that the first text representation of the spoken user request corresponds to an action better suited to be executable by another one of the at least two applications;
   transfer at least part of the first text representation of the spoken user request to the other one of the at least two of the applications using the one of the at least two of the applications, the spoken user request comprising an audio representation of the spoken user request;
   process, using a second speech-to-text module of the other one of the at least two of the applications, the at least part of the first text representation of the spoken user request comprising the audio representation of the spoken user request to obtain a second text representation of the spoken user request;
   determine, using the second speech-to-text module of the other one of the at least two of the applications that the second text representation of the spoken user request corresponds to the action; and
   cause execution of the action using the other one of the at least two applications.

4. A computer-implemented method for handling a spoken user request received from a user of an electronic device comprising a processor configured to execute applications, each one of at least three applications executing a speech-to-text instructions module on the electronic device, each one of the three applications aware of actions executable by other of the at least three of the applications, the method comprising:
   detecting reception of an audio representation of the spoken user request by a first application;
   determining, by the first application, that the spoken user request corresponds to an action better suited to be handled by a second application;
   transferring the spoken user request comprising an audio representation of the spoken user request to the second application by the first application;
   processing, by the second application, the audio representation of the spoken user request to obtain a text representation of the spoken user request;
   determining, by a second speech-to-text module of the second application, based on its awareness of actions executable by others of the applications, that the spoken user request comprising the audio representation of the spoken user request corresponds to an action better suited to be executable by a third application;
   transferring at least part of the text representation of the spoken user request to the third application, the at least part of the text representation of the spoken user request comprising the audio representation of the spoken user request;
   determining, by the third speech-to-text module of the third application, that the spoken user request corresponds to the action; and
   causing execution of the action by the third application.

5. The method of claim 4, wherein the first application and the third application are a same application.

6. The method of claim 4, wherein the third application is an application other than the first application.

* * * * *